(12) United States Patent
Mezzo et al.

(10) Patent No.: US 8,613,980 B2
(45) Date of Patent: Dec. 24, 2013

(54) METHOD FOR THE PREPARATION OF A REINFORCED THERMOSET POLYMER COMPOSITE

(75) Inventors: Luca Mezzo, Nole (IT); Ajay Godara, Heverlee (BE); Olivier Rochez, Namur (BE); Frédéric Luizi, Namur (BE); Ashish Warrier, Amersfoort (NL); Ignaas Verpoest, Leuven (BE); Stepan Lomov, Leuven (BE)

(73) Assignees: Nanocyl S.A., Sambreville (BE); Katholieke Universiteit Leuven, Leuven (BE)

( * ) Notice: Subject to any disclaimer, the term of this patent is extended or adjusted under 35 U.S.C. 154(b) by 132 days.

(21) Appl. No.: 13/003,014

(22) PCT Filed: Jul. 17, 2009

(86) PCT No.: PCT/EP2009/059247
§ 371 (c)(1),
(2), (4) Date: Mar. 30, 2011

(87) PCT Pub. No.: WO2010/007163
PCT Pub. Date: Jan. 21, 2010

(65) Prior Publication Data
US 2011/0200755 A1 Aug. 18, 2011

Related U.S. Application Data

(60) Provisional application No. 61/081,554, filed on Jul. 17, 2008.

(51) Int. Cl.
*B05D 1/36* (2006.01)
(52) U.S. Cl.
USPC ........ 427/412; 427/384; 427/385.5; 427/387; 427/389.8; 427/389.9; 427/394; 427/407.3; 427/412.1

(58) Field of Classification Search
None
See application file for complete search history.

(56) References Cited

U.S. PATENT DOCUMENTS

| | | | |
|---|---|---|---|
| 2005/0121653 A1* | 6/2005 | Chacko | 252/500 |
| 2006/0155376 A1* | 7/2006 | Asgari | 623/16.11 |
| 2007/0003749 A1* | 1/2007 | Asgari | 428/304.4 |
| 2007/0128960 A1 | 6/2007 | Ghasemi Nejhad et al. | |
| 2008/0139722 A1* | 6/2008 | Shefelbine et al. | 524/413 |
| 2009/0092831 A1* | 4/2009 | Stusgen et al. | 428/367 |

FOREIGN PATENT DOCUMENTS

| | | |
|---|---|---|
| WO | WO 2005/012171 A2 | 2/2005 |
| WO | WO 2005/114324 A2 | 12/2005 |
| WO | WO 2007/130979 A2 | 11/2007 |
| WO | WO2007/130979 A2 * | 11/2007 |
| WO | WO2007/130979 A3 * | 11/2007 |
| WO | WO 2008/046165 A2 | 4/2008 |

* cited by examiner

*Primary Examiner* — Erma Cameron
(74) *Attorney, Agent, or Firm* — Reinhart Boerner Van Deuren P.C.

(57) ABSTRACT

The present invention refers to a method for the preparation of a reinforced thermoset polymer composite, said thermoset polymer composite comprising coated fibers, the coating being used as a vehicle for the introduction of carbon nanotubes into the thermoset polymer, the preparation of said reinforced thermoset polymer composite comprising the following steps: —providing fibers; —preparing a coating comprising carbon nanotubes and a polymeric binder; —applying said coating to said fibers to obtain coated fibers; —impregnating said coated fibers with a precursor of a thermoset polymer and letting part of the carbon nanotubes transfer from the coating into the precursor of the thermoset polymer; —curing said precursor containing the coated fibers and the transferred carbon nanotubes to achieve the reinforced thermoset polymer composite.

11 Claims, 3 Drawing Sheets

METHOD FOR THE PREPARATION OF A REINFORCED THERMOSET POLYMER COMPOSITE

CROSS-REFERENCE TO RELATED APPLICATIONS

This patent application is the National Stage of International Application No. PCT/US2009/059247, filed Jul. 17, 2009, that claims the benefit of U.S. Application No. 61/081,554 filed Jul. 17, 2008, the entire teachings and disclosure of which are incorporated herein by reference thereto.

FIELD OF THE INVENTION

The present invention is related to a method for the preparation of a reinforced thermoset polymer composite.

Another aspect of the invention is related to a fibre coating composition.

STATE OF THE ART

The preparation of composites is generally based on processes wherein a substrate is impregnated by a polymer composition, which is solidified after impregnation by cross-linking, forming a polymeric matrix.

Usually, the substrate is in the form of fibres, like woven or non woven fibre mats.

The viscosity of the polymer composition (matrix) during the impregnation process is a critical parameter for most of the processes such as pre-impregnation (pre-preg), Resin Transfer Moulding (RTM), Resin Injection Moulding (RIM), Vacuum Assisted Resin Transfer Moulding (VARTM), Vacuum Infusion (VI), Hand lay-up, Pulltrusion, Pullwinding and filament winding, used to perform reinforced structural composites.

For all of these processes, the lower the viscosity of the polymer composition used to impregnate the fibres, the more homogeneous the resulting impregnation of the substrate, which leads to better final properties of the composite structure and to a higher efficiency of the impregnation process (higher speed).

Generally for all type of matrixes, and especially for the thermosets, the lower the viscosity of the precursor of the polymeric matrix, the lower the resulting chemical and physical final properties of the solidified matrix (matrix brittleness, low Tg, low chemical resistance, etc.). The solidified matrixes with the highest physical and chemical properties usually also have the highest viscosity in the liquid precursor state, with the resulting restrictions in terms of their processability.

In some cases, it is possible to reduce the global viscosity of the precursor polymer composition used to impregnate the substrate by using solvents (e.g. pre-preg, filament winding, pulltrusion and pullwinding). The drawback is due to the fact that the solvents need to be eliminated from the final composite, before the cross-linking of the precursor starts.

The solvent, which in some cases remains in the matrix, usually acts as a plasticizer and degrades the final properties of said matrix.

In other cases, the solvent evaporates from the matrix after its curing, resulting in a high porosity of the final composite (higher fragility and presence of micro-cracking in the matrix).

The solvent also needs additional energy to be completely evaporated after the support impregnation (higher costs compared to the hot-melt process for instance).

The organic solvent (e.g. Methyl Ethyl Ketone or Acetone) also needs to be recycled or burned after its evaporation, resulting in higher costs for the production and higher risks for the workers implicated in the substrate impregnation process.

For the processes which do not use solvents at all, the necessary viscosity for the processability of the precursor is achieved by a temperature increase. Nevertheless the temperature cannot be increased for the hand lay-up process or can only slightly be increased for all other processes. Depending on the type of polymers in the matrix, above a certain temperature limit, degradation starts or cross-linking starts (in case of thermoset matrixes), thereby reducing the impregnation time window.

Some additives used to increase the physical and chemical properties of the matrix also increase significantly the viscosity of the matrix precursor in the liquid state (e.g. poly(arylene ether sulphones) in epoxy matrixes), making such composition unsuitable for low viscosity processes. The additives which do not increase too much the viscosity of the matrix in the liquid state (e.g. PBS and phenoxy) reduce some of its physical properties after solidification, such as the Tg, and/or increase the Coefficient of Thermal Expansion (CTE).

AIMS OF THE INVENTION

The present invention aims to provide a method for the preparation of a reinforced thermoset polymer composite that does not present the drawbacks of the prior art.

More particularly, the present invention aims to provide a method to perform a reinforced composite material, improving some physical properties of said composite, such as mechanical properties and/or electrical conductivity, without increasing the difficulty of the impregnation process.

SUMMARY OF THE INVENTION

The present invention is related to a method for the preparation of a reinforced thermoset polymer composite, said thermoset polymer composite comprising coated fibres, the coating being used as a vehicle for the introduction of carbon nanotubes into the thermoset polymer, the preparation of said reinforced thermoset polymer composite comprising the following steps:
  providing fibres;
  preparing a coating comprising carbon nanotubes and a polymeric binder;
  applying said coating to said fibres to obtain coated fibres;
  impregnating said coated fibres with a precursor of a thermoset polymer and letting part of the carbon nanotubes transfer from the coating into the precursor of the thermoset polymer;
  curing said precursor containing the coated fibres and the transferred carbon nanotubes to achieve the reinforced thermoset polymer composite.

According to particular preferred embodiments, the invention further discloses at least one or a suitable combination of the following features:
  the thermoset polymer comprises a polymer selected from the group consisting of epoxy, vinylester, unsaturated polyester, phenolic and their blends and co-polymers;
  the weight ratio between the carbon nanotubes and the polymeric binder in the coating is higher than or equal to 1:9, more preferably higher than or equal to 1:4;
  the weight ratio between the carbon nanotubes and the thermoset polymer in the reinforced composite is higher than 1:1000;

the polymeric binder is selected from the group consisting of aromatic poly(hydroxyl ether) (phenoxy), silanes and their blends and/or co-polymers;

the carbon nanotubes are dispersed in a solvent before being dispersed in the coating;

the precursor of the thermoset polymer comprises carbon nanotubes prior to impregnation;

the fibres are selected from the group consisting of carbon, polyaramides, glass and mixture thereof;

the fibres are selected from the group consisting of carbon fibres, glass fibres, and mixture thereof.

Another aspect of the invention is related to a fibre coating composition comprising:

a polymeric binder selected from the group consisting of aromatic poly(hydroxyl ether) (phenoxy), silanes and their blends and/or co-polymers;

carbon nanotubes, wherein the weight ratio between the carbon nanotubes and the polymeric binder is higher than 1:9 and preferably higher than 1:4.

FIGURE KEYS

Figure 1:
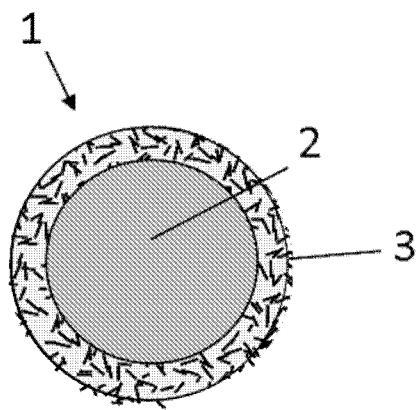
FIG. 1 represents a coated fibre according to the invention.
Figure 2:
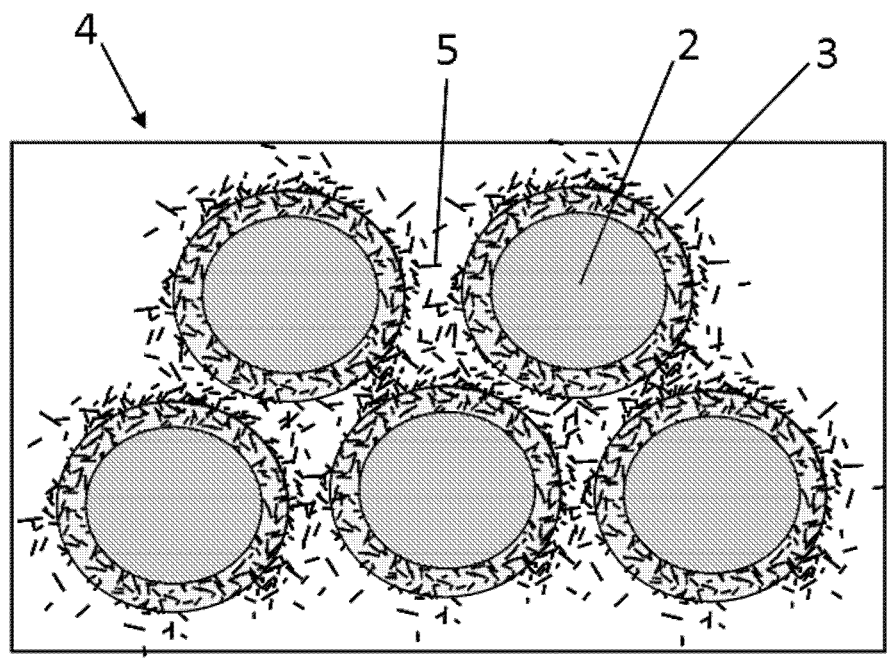
FIG. 2 represents a fibre-reinforced composite, with carbon nanotubes (CNT) which have partially migrated into the matrix (second polymer composition).
Figure 3:
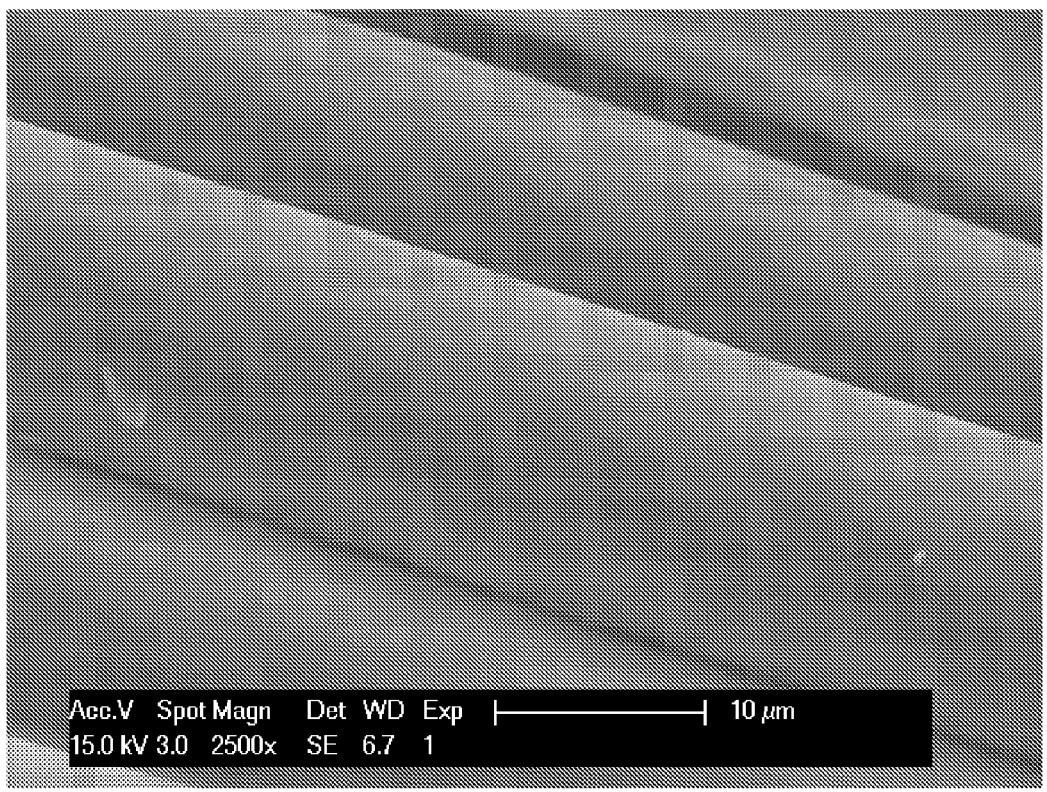
FIG. 3 represents a scanning electronic microscopy (SEM) of un-coated glass fibres.

1 Coated fibre.
2 Fibre.
3 Coating comprising carbon nanotubes (CNT).
4 Reinforced thermoset polymer composite.
5 Thermoset polymer matrix comprising CNT transferred from the fibre coating 3.

DESCRIPTION OF THE INVENTION

The object of the present invention is a method to produce a final composite structure with enhanced static and dynamic mechanical and physical properties such as impact resistance, fracture toughness, compression, electrical conductivity etc., without affecting noticeably other physical characteristics of the impregnating polymer composition (matrix), such as the viscosity (processability restrictions) and of the final composite material, such as the glass transition temperature (Tg) (operational limitation).

The present invention refers to a method for the preparation of a reinforced thermoset polymer composite, said thermoset polymer composite comprising coated (sized) fibres, the coating (sizing) being used as a vehicle for the introduction of carbon nanotubes into the thermoset polymer, the preparation of said reinforced thermoset polymer composite comprising the following steps:

providing fibres;

preparing a coating (sizing) comprising carbon nanotubes and a polymeric binder;

applying said coating to said fibres to obtain coated (sized) fibres;

impregnating said coated fibres with a precursor of a thermoset polymer;

transferring part of the carbon nanotubes from the coating into the precursor of the thermoset polymer;

curing said precursor containing the coated fibres and the diffused carbon nanotubes to achieve the reinforced thermoset polymer composite.

The fibres are preferably in the form of non-woven or woven fibre mats.

The present invention also refers to a method in which carbon nanotubes are placed at the surface of fibres to be further impregnated by a precursor of a thermoset polymer, to obtain a final composite material reinforced with CNT in its matrix.

The fibres described in the present invention are preferably chosen from the group consisting of carbon, polyaramides and glass.

The carbon nanotubes described in the present invention can be single-wall (SWCNTs) or multi-wall (MWCNTs) and are characterized by a diameter between 0.5 and 75 nm.

Preferably, the polymeric binder described in the present invention comprises a polymer selected from the group consisting of poly(hydroxyl ether) (phenoxy), silanes and their blends.

The thermoset polymer used to impregnate the coated fibres is selected from the group consisting of epoxy, vinylester, unsaturated polyester, phenolic resins, their blends and co-polymers.

The most frequently used technologies to impregnate a support (substrate) with a thermoset precursor, especially if the support has a fibrous structure, can be divided in four categories, depending on the method used to impregnate the substrate and the curing process.

The first category is represented by the pre-impregnation (pre-preg) processes. In those processes, the fibrous support is impregnated by a thermoset polymer precursor (matrix), through a hot-melt process (the thermoset polymer precursor is molten to form a film which is then joined to the substrate) or through a solvent process (the thermoset polymer precursor is dissolved in a solvent to reduce its viscosity level and to improve the quality of the impregnation). The solvent process is often used when the matrix has a viscosity too high to be filmed by the hot-melt method.

Several layers of the impregnated support are then placed in a mould and the matrix is then cured. In case of a thermoset matrix, it is not fully cured at this stage (B-Stage) and it is later formed in a final shape in a mould for the further matrix consolidation (curing), normally under higher temperature and pressure.

The second category consists of processes using a closed mould, such as Resin Transfer Moulding (RTM), Resin Injection Moulding (RIM), Vacuum Assisted Resin Transfer Moulding (VARTM) and Vacuum Infusion (VI). In those processes, the fibrous substrate is first placed in a closed mould and the impregnating polymer composition (matrix) is injected under pressure (RTM and RIM), the impregnation is helped by an extra vacuum done in the mould to help the impregnation (VARTM) or the impregnating polymer composition (matrix) is only sucked by the vacuum created in the mould (VI). The impregnating polymer composition (precursor) is then consolidated by increasing the temperature of the mould (curing).

The third category of impregnation technologies is Hand lay-up (Thermosets). In this category, the fibrous support is placed in an open mould and impregnated by hand. The matrix is then consolidated at room temperature, either by reactions with atmospheric components or by mixing the reactants just before impregnation.

The fourth category of impregnation technologies corresponds to pulltrusion, pullwinding and filament winding. In such technologies, the fibrous support is first impregnated by the thermoset polymer precursor and, immediately after that, placed around a rotating shape (filament winding) or extruded through a dye (pulltrusion and pullwinding). The precursor is then consolidated (cured) immediately after the support impregnation, usually through the help of a temperature increase.

A reinforced structural composite comprising fibres (substrate) can be decomposed in three areas, each of those areas giving particular mechanical properties to the reinforced structural composite.

The first area is the part of the structural composite in which the fibres transfer the dominant mechanical properties to the reinforced structural composite. This first area is located in the volume occupied by the fibres themselves. The properties given by the fibres can be measured, in case of anisotropic fibres, by a test measuring the mechanical properties in a direction parallel to the orientation of the substrate (i.e. fibre direction).

The second area is the part of the structural composite wherein the matrix transfers the dominant mechanical properties to the reinforced structural material. This second area is located in the volume of the structural composite occupied by the matrix. The results of the G1c test, consisting in measuring the fracture toughness of the structural composite, are dominated by the properties of this second area (matrix).

Nevertheless, the G1c test only gives pertinent results in case of brittle matrixes, such as cured epoxy resin and the like. In case of tough matrixes such as polypropylene and usually thermoplastics above their Tg, the flexural modulus gives better indication of the matrix behaviour.

The third area is the part of the structural composite in which the mechanical properties of the structural composite are given by the interface between the substrate and the matrix. The mechanical properties given by the interface can be measured by Inter Laminates Shear Strength (ILSS).

Carbon nanotubes are well known products having interesting electrical, thermal and mechanical properties. CNT can transfer their interesting properties to a material, in which such CNT are (homogeneously) dispersed.

As previously mentioned, the viscosity of the impregnating precursor polymer composition (later forming the matrix) is also an important parameter to achieve a reinforced structural material with high mechanical performance. The level of viscosity can affect the use of processes to perform a reinforced structural composite.

High viscosity material can prevent the use of processes such as RTM, RIM, etc. that need low viscosity material to perform reinforced structural composites. During the impregnation step, the level of viscosity is given by the viscosity of the impregnating precursor polymer composition. As described before, the use of additives such as CNT affects the viscosity (increase of the viscosity of the impregnating precursor polymer composition).

The method described in the present invention allows to introduce CNT in a structural composite while maintaining the viscosity level of the precursor close to that of the precursor of a virgin matrix.

In the present invention, the introduction of CNT is essentially made by the fibres with a coating containing carbon nanotubes. The CNT are placed on the surface of the substrate through this coating process.

The coating of the present invention further comprises a polymeric binder in which the carbon nanotubes are dispersed.

The polymeric binder with the CNT dispersed therein can be based on thermosets or thermoplastic polymers or their blends. The coating is preferably in the form of a dispersion or an emulsion.

The precursor of the thermoset polymer then used to impregnate the coated fibre substrate can be free or almost free of CNT before the impregnation process. During the impregnation process, thanks to the diffusion of the CNT from the coating into the matrix, the CNT are at least partially transferred into the thermoset polymer (matrix).

In such a process, the increase of the viscosity of the precursor of the thermoset polymer by the CNT is avoided during the impregnation step.

The transfer of the CNT properties to the structural material is achieved with the method of the present invention thanks to the dispersion (transfer) of CNT in the precursor of the thermoset polymer (matrix). The dispersion (transfer) of the CNT induces at least two different mechanisms:
- an increase of the interface properties (e.g. Interfacial Shear Strength IFSS), due to the CNT which remain localised in the coating, at the interface between the fibre substrate and the matrix and;
- an increase of the properties of the matrix (e.g. fracture toughness and/or flexural modulus), from the CNT which diffuse (migrate) in the thermoset polymer (matrix) after the impregnation step of the fibre support.

The CNT and the type of technique to place them on the surface of a fibre substrate are chosen in order to obtain a sufficient interaction between the CNT and the fibre substrates so that, after further impregnation of the fibres by the thermoset polymer precursor, a part of the CNT remains attached to the fibre surface and another part migrates in the precursor of the thermoset polymer (matrix).

The CNT remaining on the fibre surface also induce a high increase of the macroscopic conductivity of the reinforced composite, which can be of interest in applications, wherein electromagnetic shielding is necessary.

EXAMPLES OF EPOXY BASED COMPOSITES

Example 1

Lab scale equipment was used to impregnate precut unidirectional glass fibre fabrics (300 mm by 300 mm) by first dipping them in a coating bath followed by squeezing the excess of coating.

Then, the impregnated fabrics were dried in the oven at 120° C. for 3 minutes and then treated at 150° C. for 3 minutes.

The coating was a water dispersion of phenoxy (tradename Hydrosize HP3-02) polymeric binder, wherein multi-wall carbon nanotubes were dispersed. The concentration of solid (Phenoxy+CNT) in the coating was about 32% and the ratio between the phenoxy binder and the carbon nanotubes was 2:1.

Figure 4:
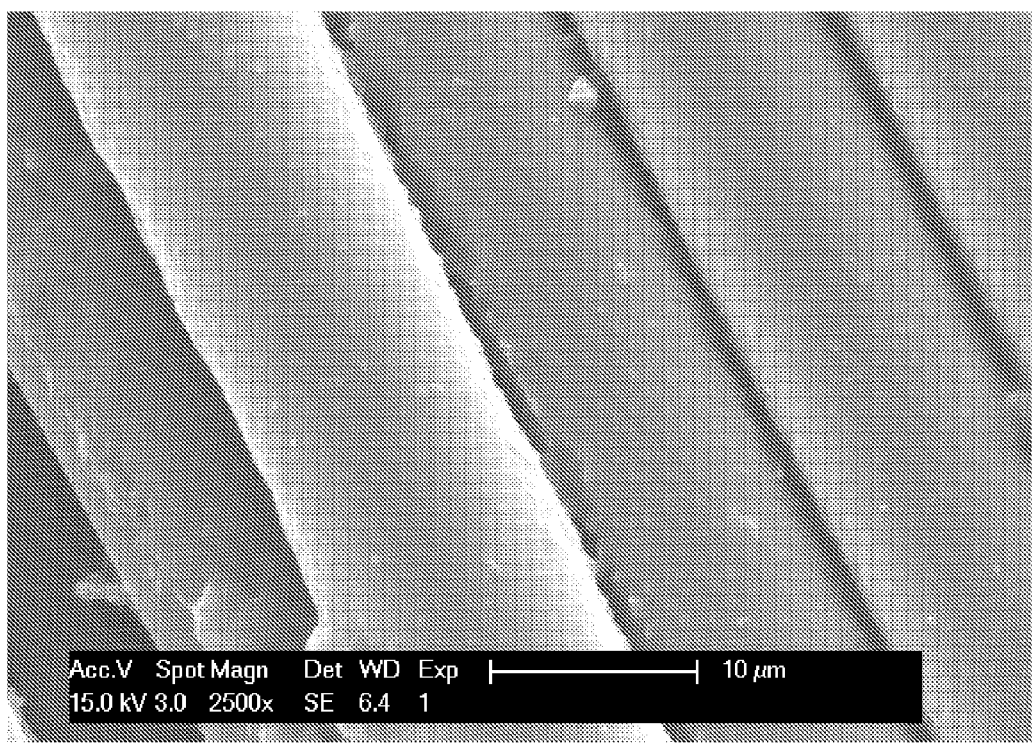
FIG. 4 represents a scanning electronic microscopy (SEM) of coated glass fibres, according to the invention.

The final amount of dried coating on the surface of the fibre was about 1.12 wt % (Weight coating/Weight fibres). The final amount of the CNT on the surface of the glass fibres was therefore about 0.38% (Weight CNT/Weight fibres). The visual aspect of the sized glass fibres shows a homogeneous coating and a homogeneous dispersion of the CNT in the binder as shown in FIG. 4.

These coated glass fibres (SGF) were then further impregnated with a standard bisphenol-A based epoxy resin used for the hot-melt pre-preg process, produced by Huntsman. The impregnation was performed through a drum winder device to obtain a unidirectional pre-preg leading to a resin content of about 50% by weight.

It was observed at that stage that the epoxy precursor resin had turned black during the impregnation process, indicating a transfer of at least a part of the carbon nanotubes from the fibre coating to the epoxy precursor resin.

The pre-pregs were cut into dimensions of 300 mm by 250 mm and were cured at 120° C. for 1 hour, followed by a post curing at 140° C. for 2 hours. Composite laminate sheets with a thickness of about 2.0 mm were obtained with a final fibre volume fraction ranged between 45 and 50%. The mechanical testing for fracture toughness (G1c) and flexural properties were conducted according to standards ASTM5528 and ASTM D790.

A rheometer (from Anton Paar) was used to analyse the viscosity. Parallel plate geometry with 1 mm gap and 25 mm diameter was used.

The samples were allowed to rest for 5 min after loading so that they could recover from any induced stress.

Measurements were taken in dynamic mode at room temperature (25° C.) for epoxy. Dynamic strain sweeps at a constant frequency were used to find the linear viscoelastic region (LVR) in which the storage modulus (G') and the loss modulus (G") were independent of strain amplitude. G' (MPa) and G" (MPa) and complex viscosity (Pas) values were measured.

The viscosity of the virgin epoxy resin was about 13 Pa·s. If the same quantity of carbon nanotubes had to be mixed in the matrix before impregnation, the epoxy resin/nanotubes mixture would have a nanotube concentration of about 0.6% nanotubes by weight. Such a concentration would increase the viscosity by more than one order of magnitude.

Example 2(Comparative)

The same procedure as in example 1 was used, except that no coating was applied to the fibres.

Example 3(Comparative)

The same procedure as in example 1 was used, except that no carbon nanotubes were added to the coating applied to the fibres.

Example 4

Carbon fibres, 100% unidirectional (UD), having an aerial weight of 300 g/m$^2$ were used. The fibres were first dipped in a coating bath followed by squeezing the excess of coating.

Then, the coated fibres were dried in an oven at 120° C. for 3 minutes and then treated at 150° C. for 3 minutes.

The coating was a water dispersion of phenoxy (tradename Hydrosize HP3-02) polymeric binder and carbon nanotubes. The concentration of solid (Phenoxy+CNT) in the coating was about 32% and the ratio between the phenoxy binder and the carbon nanotubes was 2:1.

The fibres were then put in a mould and impregnated by RTM with an epoxy resin (Epikote 828). The epoxy precursor resin was mixed with a hardener at room temperature followed by a degassing step for 15-30 min. In the beginning, the resin was introduced by applying vacuum and later by a combination of vacuum and pressure.

It was again observed that the epoxy resin had turned black during the impregnation process, indicating a transfer of at least part of the carbon nanotubes from the coating into the epoxy precursor resin.

The testing samples produced had the same dimensions as in example 1.

The weight fraction of the carbon fibres in the final composite was estimated to be 56 wt %. The concentration of carbon nanotubes in the final composite was 0.2 wt %.

Example 5(Comparative)

The same procedure as in example 4 was used, except that no coating was applied to the fibres.

Example 6

The same procedure as in example 4 was used, except that polyethylene terephtalate (PET) textile having an aerial weight of 250 g/m$^2$ were used instead of the glass fibres. No G1c measurement was performed, due to the inherent high toughness of PET. The fibres represented 57 wt % of the total composite, and the carbon nanotubes represented 0.2 wt % of the composite.

Example 7(Comparative)

The same procedure as in example 6 was used, except that no coating was applied to the fibres.

TABLE 1 mechanical and electrical measurement results of epoxy based composites

| Example | G1c Crack initiation J/m$^2$ | Electrical Resistance Fibre in direction (k ohm/m) |
|---|---|---|
| 1 | 474 | 2142 |
| 2 | 375 | (insulator) |
| 3 | 414 | (insulator) |
| 4 | 460 | 0.32 |
| 5 | 370 | 1.7 |
| 6 | — | 42857 |
| 7 | — | (insulator) |

In the G1c test presented in table 1, the laminates obtained with the coated glass fibres (SGF/EP) showed better results than the uncoated glass fibres (VGF/EP). The presence of carbon nanotubes in the coating of the glass fibres is found to be improving the energy for delamination initiation.

The interlaminar fracture energy (GI) for coated glass fibres in the reinforced thermoset polymer composite also shows an improvement of 10% with respect to the composite with uncoated glass fibres. This is attributed to the strong fibre/matrix interfacial adhesion due to a CNT network.

The presence of CNT prevents the initiation and further propagation of delamination of the fibre/matrix interface. It is interesting to observe that with further addition of CNT in the matrix (0.5% by weight in the matrix) along with CNT in the fibre coating the fracture initiation energy shows a further improvement (SGF/EP-CNT).

Additional examples, varying the level of carbon nanotubes, indicate that an improvement of G1c is observed for ratios of CNT/polymeric binder in the fibre coating as low as 1:9.

The flexural modulus and flexural strength of the composite of the examples 6 and 7 comprising PET fibres have been additionally tested. The presence of the coating comprising CNT in example 6 improves the flexural modulus by 10%, from 3.3 GPa in example 7 to 3.5 GPa in example 6. The flexural strength was improved by 20%, from 93 MPa in example 7 to 122 MPa in example 6.

What is claimed is:

1. A method for the preparation of a reinforced thermoset polymer composite, said thermoset polymer composite comprising coated fibres, the coating being used as a vehicle for the introduction of carbon nanotubes into the thermoset polymer, the preparation of said reinforced thermoset polymer composite comprising the following steps:
   providing fibres;
   preparing a coating comprising carbon nanotubes and a polymeric binder;
   applying said coating to said fibres to obtain coated fibres;
   impregnating said coated fibres with a precursor of a thermoset polymer and thereby letting part of the carbon nanotubes transfer from the coating into the precursor of the thermoset polymer;
   curing said precursor containing the coated fibres and the transferred carbon nanotubes to achieve the reinforced thermoset polymer composite.

2. The method according to claim 1, wherein the thermoset polymer comprises a polymer selected from the group consisting of epoxy, vinylester, unsaturated polyester, phenolic and their blends and co-polymers.

3. The method according to claim 1, wherein the weight ratio between the carbon nanotubes and the polymeric binder in the coating is higher than or equal to 1:9.

4. The method according to claim 1, wherein the weight ratio between the carbon nanotubes and the polymeric binder in the coating is higher than or equal to 1:4.

5. The method according to claim 1, wherein the weight ratio between the carbon nanotubes and the thermoset polymer in the reinforced composite is higher than 1:1000.

6. The method according to claim 1, wherein the polymeric binder is selected from the group consisting of aromatic poly(hydroxyl ether), polysilanes and their blends and/or co-polymers.

7. A method according to claim 6, wherein the aromatic poly(hydroxyl ether) is a phenoxy polymer.

8. The method according to claim 1, wherein the carbon nanotubes are dispersed in a solvent before being dispersed in the coating.

9. The method according to claim 1, wherein the precursor of the thermoset polymer comprises carbon nanotubes prior to impregnation.

10. The method according to claim 1, wherein the fibres are selected from the group consisting of carbon, polyaramides, glass and mixture thereof.

11. The method according to claim 1, wherein the fibres are selected from the group consisting of carbon fibres, glass fibres, and mixture thereof.

* * * * *

UNITED STATES PATENT AND TRADEMARK OFFICE
CERTIFICATE OF CORRECTION

PATENT NO. : 8,613,980 B2  
APPLICATION NO. : 13/003014  
DATED : December 24, 2013  
INVENTOR(S) : Luca Mezzo et al.

Page 1 of 1

It is certified that error appears in the above-identified patent and that said Letters Patent is hereby corrected as shown below:

Title Page: (73) Assignees:
Remove "Katholieke Universiteit Leuven, Leuven (BE)"

Signed and Sealed this
Fifth Day of August, 2014

Michelle K. Lee
*Deputy Director of the United States Patent and Trademark Office*